United States Patent [19]
Alexander et al.

[11] Patent Number: 5,161,852
[45] Date of Patent: Nov. 10, 1992

[54] CONVERTIBLE TOP WITH IMPROVED GEOMETRY

[75] Inventors: Michael P. Alexander, Grosse Ile; William A. Sims, Lincoln Park; George A. Corder, Romulus; Albert W. Harrison, Bloomfield, all of Mich.

[73] Assignee: ASC Incorporated, Southgate, Mich.

[21] Appl. No.: 683,777

[22] Filed: Apr. 11, 1991

[51] Int. Cl.⁵ ............................................... B60J 7/12
[52] U.S. Cl. ..................................... 296/108; 296/117
[58] Field of Search ............... 296/107, 108, 116, 117, 296/120.1, 121

[56] References Cited

U.S. PATENT DOCUMENTS

| | | | |
|---|---|---|---|
| 3,994,524 | 11/1976 | Lehmann | 296/107 |
| 4,712,828 | 12/1987 | Albrecht | 296/107 |
| 4,936,626 | 6/1990 | Gmeiner et al. | 296/116 |
| 4,984,841 | 1/1991 | Bauer et al. | 296/116 |
| 5,004,291 | 4/1991 | Bauer et al. | 296/116 |

FOREIGN PATENT DOCUMENTS 413467  6/1934  United Kingdom ................ 296/107

Primary Examiner—Robert R. Song
Attorney, Agent, or Firm—Harness, Dickey & Pierce

[57] ABSTRACT

A vehicle convertible top linkage assembly having improved means for controlling the articulation of the convertible top as it is raised and lowered. This linkage assembly includes a pair of pillar links that are pivotally coupled to the vehicle and a pair of balance links that control the articulation of the convertible top. The balance links are coupled to the linkage assembly by coupling means that simultaneously allow the balance links to be pivotally and longitudinally displaced. Longitudinal displacement of the balance links is accomplished by a variety of displacing means and serves the purpose of actuating the control links. These displacing means displace the balance link when the convertible top is being raised and lowered to provide various paths of movement.

59 Claims, 12 Drawing Sheets

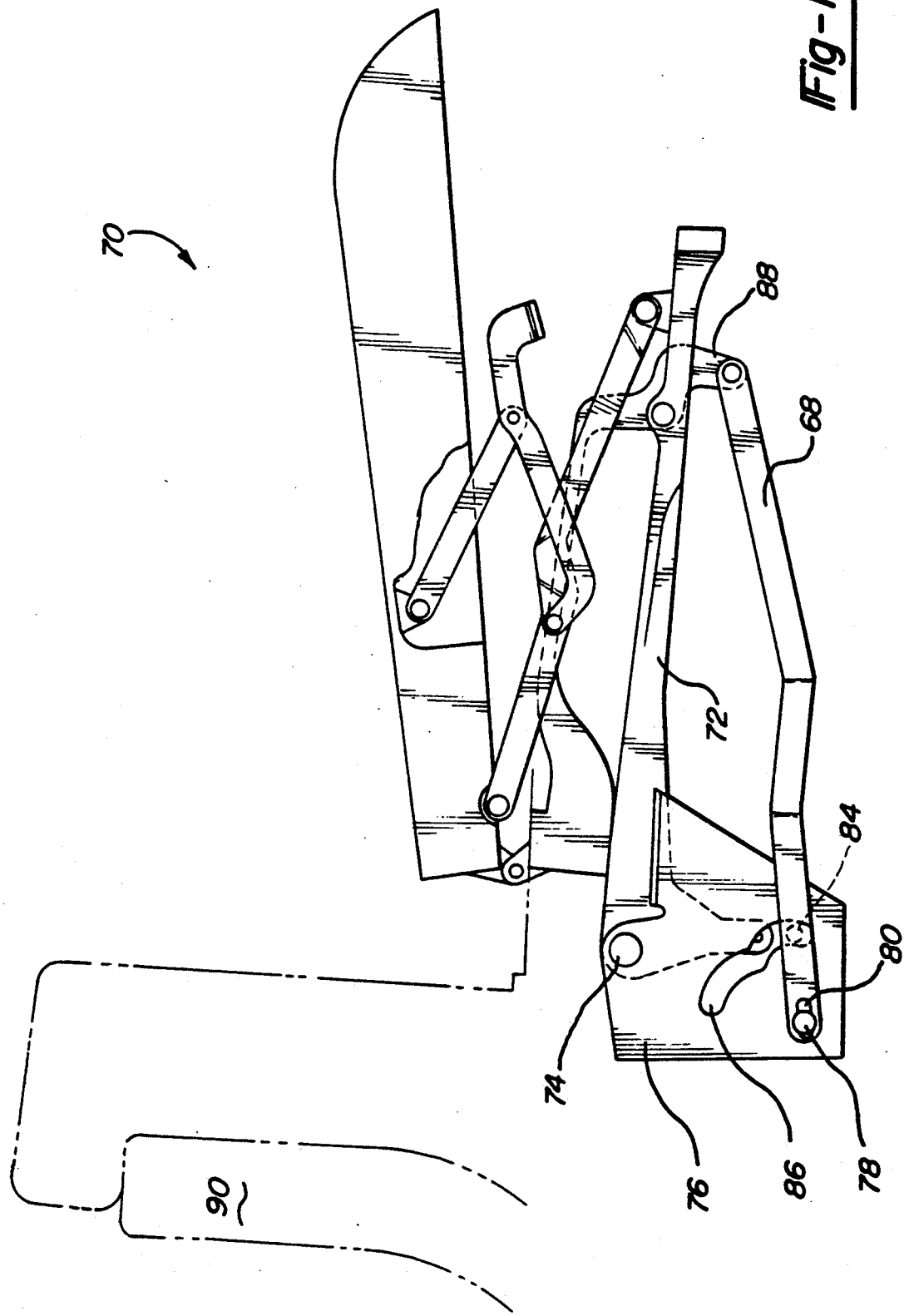

CONVERTIBLE TOP WITH IMPROVED GEOMETRY

BACKGROUND AND SUMMARY OF THE INVENTION

This invention relates generally to the raising and lowering of convertible tops, and more particularly to controlling the articulation of a convertible top as it is being lowered and raised. The invention further relates to means utilized for facilitating the control of such convertible top articulation.

The present invention is well suited to vehicles utilizing collapsible convertible tops that store in on-board storage compartments. In general, these types of convertible tops utilize a linkage assembly, coupled to the vehicle, that collapses into the on-board storage compartment as the convertible top is lowered. Conversely, as the convertible top is raised, the linkage assembly is articulated into a fully erect, uncollapsed state. These types of linkage assemblies often use a balance link, pivotally coupled at one end to a control link, to control the articulation of the convertible top as it is raised and lowered. The opposite end of the balance link is pivotally coupled to a stationary portion of the vehicle and is therefore limited to pivotal movement. As a result, the balance link cannot be longitudinally displaced, consequently, the actuation of the control link is limited and the articulation of the convertible top is restricted accordingly.

In order to obtain a more desirable articulation of the convertible top as it is raised and lowered, it has been discovered that a system of cams, cam followers, sliding pivot points, and/or springs can be utilized in conjunction with the balance link. These devices permit controlled longitudinal displacement of the balance link as the convertible top is raised and lowered, thereby precisely actuating the control link to achieve total control over the convertible top stack during articulation. This ability to control and modify the rate of convertible top articulation, and the positioning of the convertible top, at any point in the cycle provides several advantages. For example, one advantage of the present invention is that the convertible top linkage assembly is articulated into a fully erect, non-collapsed idled position before reaching the header. The invention then allows the linkage assembly to be pivoted from this idled position either manually or by powered actuation into a raised operative position, while in a fully erect, non-collapsed state. Accordingly, the speed at which the convertible top approaches the vehicle can be accurately decreased to eliminate header slam and the associated noise. Furthermore, when the convertible top is initially lifted off the header and windows, it remains in a fully erect, non-collapsed state until the linkage assembly reaches the idled position where there is clearance between itself and the adjacent portions of the vehicle such as the side windows. This prevents the convertible top from interfering with the vehicle once it goes into its lift cycle and articulates into a collapsed position. Thus, it is unnecessary to lower the side windows prior to retracting the convertible top. It is a further advantage of the present invention to provide a means for controlling the overall articulation of the convertible top as it is raised and lowered so that it can be raised and lowered without interference from side windows, roll bars, etc.

Additional advantages and features of the present invention will become apparent in light of the following description and claims taken in conjunction with the accompanying drawings.

BRIEF DESCRIPTION OF THE DRAWINGS

FIG. 15 is a schematic representation of the third embodiment of the present invention showing one side of the linkage assembly with the convertible top in a fully lowered, collapsed position within the on-board storage compartment.

DETAILED DESCRIPTION OF THE PREFERRED EMBODIMENT

Figure 1:
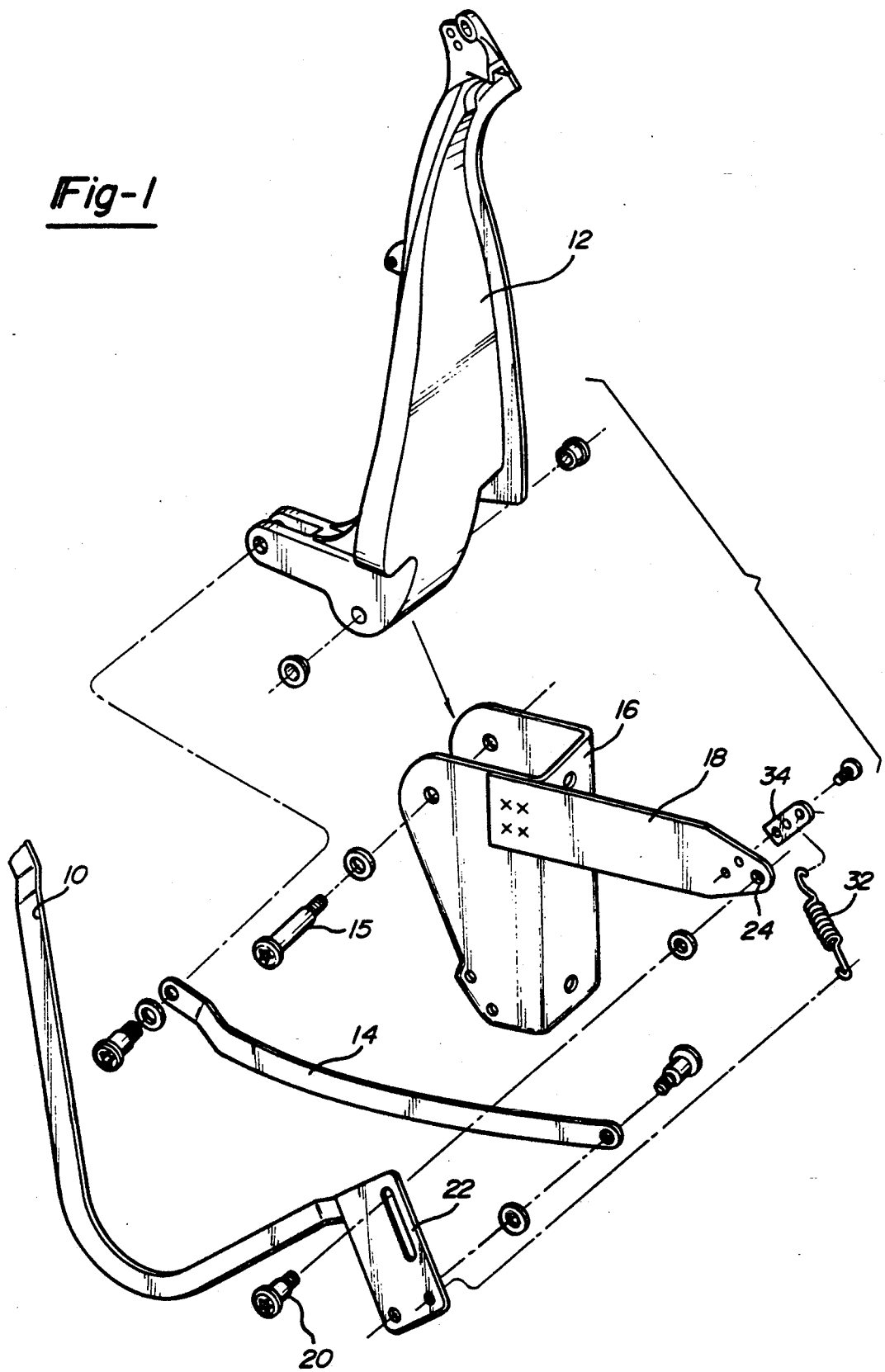
FIG. 1 is an exploded perspective view of a first embodiment of the present invention illustrating means for longitudinally displacing the balance link as the convertible top is raised and lowered.

Referring now to the drawings and in particular to FIG. 1, displacing means for longitudinally displacing a balance link 10 are shown. FIG. 1 illustrates the first displacing means embodiment which is comprised of a balance link 10, a conventional pillar link 12 and a conventional idler link 14. The pillar link 12 is shown to be pivotally coupled by a pin 15 to a bracket 16 that rigidly affixes to a vehicle (not shown) in the usual place. The pillar link 12 is also pivotally coupled to the rearward end of the idler link 14. The opposite end of the idler link 14 is pivotally coupled to a lower portion of the balance link 10, which is itself coupled to a rigid member 18 that depends forwardly from the bracket 16. As shown in FIG. 1, the balance link 10 is coupled to this rigid member 18 by a pin 20 that passes through an elongated slot 22 in the balance link 10 and engages with a bore 24 in the rigid member 18. This type of coupling arrangement permits the balance link 10 to displace longitudinally with respect to the pin 20 as it pivots about the pin 20.

Figure 2:
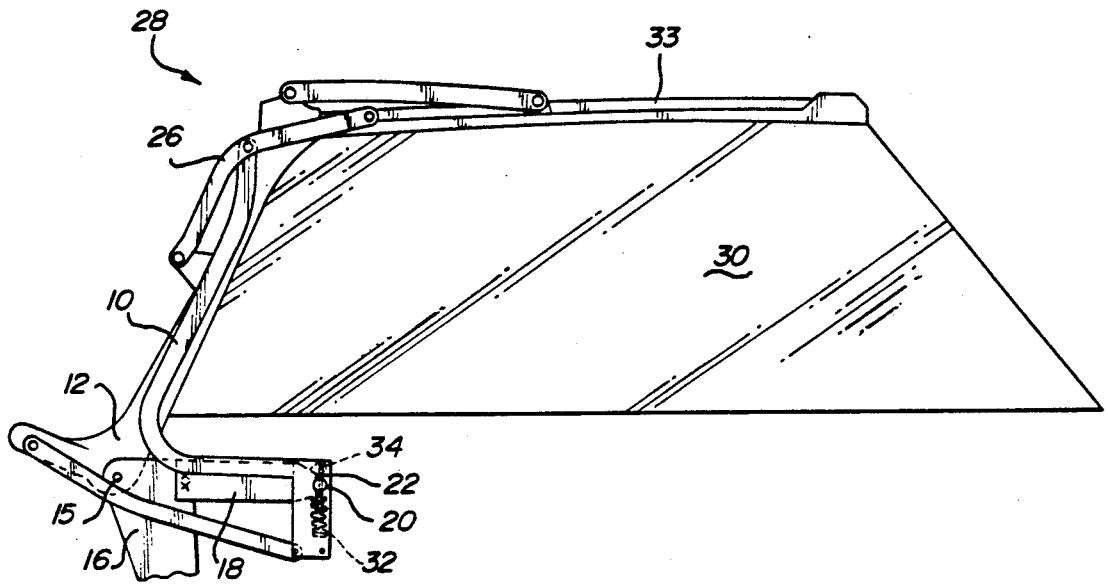
FIG. 2 is a schematic representation of the first embodiment of the present invention showing one side of the linkage assembly with the convertible top in a raised operative or closed position.

FIGS. 2-5 illustrate how longitudinal displacement of the balance link 10 controls the actuation of the control link 26 and therefore improves the control over the convertible top's articulation as it is raised and lowered. FIG. 2 illustrates one side of the linkage assembly 28 with the convertible top latched in its raised operative position. The convertible top is latched in this position by conventional retainers (not shown), such as a J-hooks, that latch the linkage assembly 28 to the usual windshield assembly (not shown). Note that when the convertible top is in this raised operative position, the vehicle side windows 30 are engaged with the usual seals (not shown) that depend from the side rails 33 and the pillar links 12.

Figure 3:
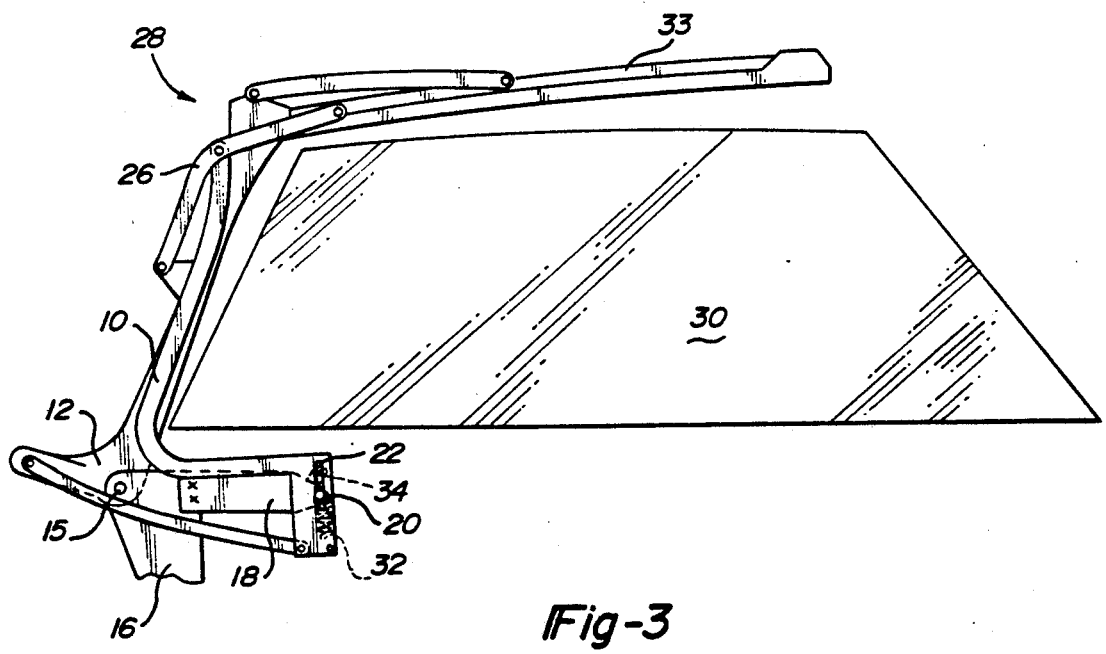
FIG. 3 is a schematic representation of the first embodiment showing one side of the linkage assembly with the convertible top slightly retracted from its raised operative position, showing that there is clearance between the convertible top and the vehicle side window while the convertible top remains in a fully erect, non-collapsed position in accordance with the principles of the present invention.

FIG. 3 illustrates the convertible top having been slightly retracted from the raised operative position to a position where there is clearance between the vehicle side window 30 and the convertible top. This retraction is accomplished by unlatching the linkage assembly 28 from the windshield assembly and either manually or automatically pivoting the pillar link 12 toward the rearward portion of the vehicle. Note in FIG. 2 that a coil spring 32 stretches in tension between the lower portion of the balance link 10 and a finger 34 extending from the rigid member 18. Thus, as the convertible top is slightly retracted, the coil spring 32 is relaxed and energy stored in the spring 32 assists in this retraction of the linkage assembly 28. Conversely, as the convertible top is moved from the retracted position shown in FIG. 3 to the raised operative position shown in FIG. 2, it is desirable to prevent the linkage assembly 28 from slamming down on the windshield assembly. Preferably, a spring 32 relieves the downward weight of the linkage assembly 28 and permits the assembly 28 to be lowered with relative ease either automatically by hydraulic actuators or manually. Alternatively, means such as manually or mechanically slowing the movement of the convertible top can be used to avoid having the linkage assembly 28 slam down on the windshield assembly.

Figure 4:
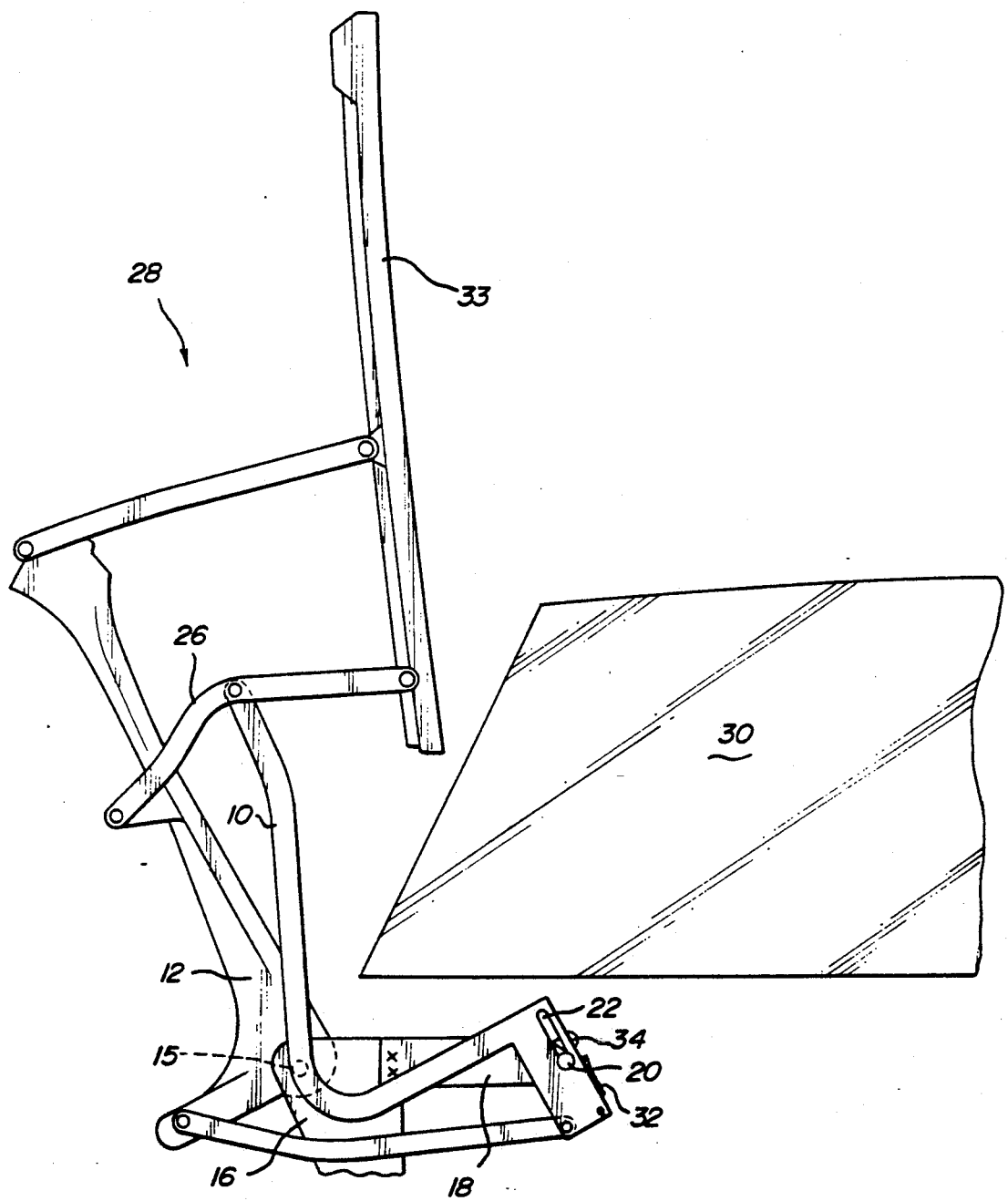
FIG. 4 is a schematic representation of the first embodiment of the present invention showing one side of the linkage assembly with the convertible top articulating into a collapsed position as the convertible top is lowered toward an on-board storage compartment.
Figure 5:
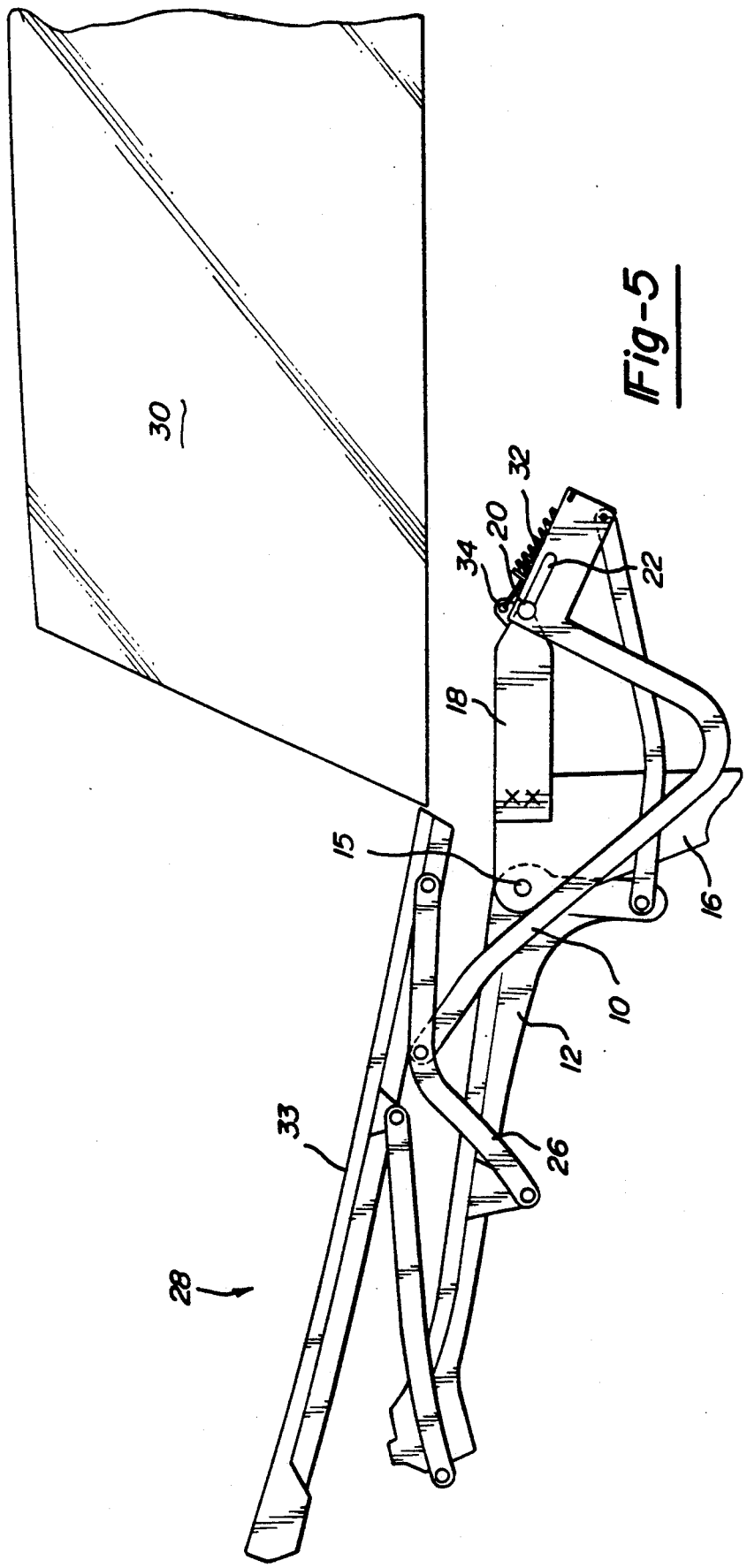
FIG. 5 is a schematic representation of the first embodiment of the present invention showing one side of the linkage assembly with the convertible top in a fully lowered, collapsed position within the on-board storage compartment.

As the pillar link 12 is rotated rearward from the position shown in FIG. 2, the balance link 10 and the idler link 14, along with the remainder of the linkage assembly 28, rotate generally about the pivotal axis of the pillar link 12. Since the elongated slot 22 in the balance link 10 is tangentially oriented with respect to the pivotal axis of the pillar link 12, the balance link 10 is able to rotate freely until the lower end of the elongated slot 22 engages the corresponding pin 20. Thus, as the convertible top is retracted slightly from its raised operative position in FIG. 2 to its position in FIG. 3, the balance link 10 is not loaded and merely floats upon the pin 20 that couples it to the rigid member 18. Accordingly, the control link 26 is not actuated and the linkage assembly 28 does not begin to collapse. However, as the convertible top continues to be lowered from its position in FIG. 3, as shown in FIG. 4, the pin 20 engages with the lowermost portion of the elongated slot 22 and the balance link 10 is no longer permitted to float. Consequently, the balance link 10 is loaded in tension as the pillar link 12 continues to rotate rearwardly. This actuates the control link 26 which causes the linkage assembly 28 to collapse in the usual manner as it is lowered.

A careful study of FIGS. 2-5 illustrate that the longitudinal displacement of the balance link 10 only affects the linkage assembly configuration as the convertible top is being raised or lowered. In other words, when the convertible top is in its raised operative position, as shown in FIG. 2, the pin 20 coupling the balance link 10 to the rigid member 18 is engaged with the uppermost portion of the elongated slot 22. When the linkage assembly 28 is in its lowered collapsed position as shown in FIG. 5, the pin 20 is again engaged in the uppermost portion of the elongated slot 22. Thus, the effective length of the balance link 10 is the same in both the raised operative position and the collapsed lowered position. The effective length of the balance link 10 only changes when the balance link 10 is being longitudinally displaced with respect to the pin 20 as the convertible top is being raised and lowered. This longitudinal displacement of the balance link 10 with respect to the pin 20 is illustrated in FIGS. 2-5 as the convertible top is lowered from its position in FIG. 2 to its position in FIG. 5.

Figure 6:
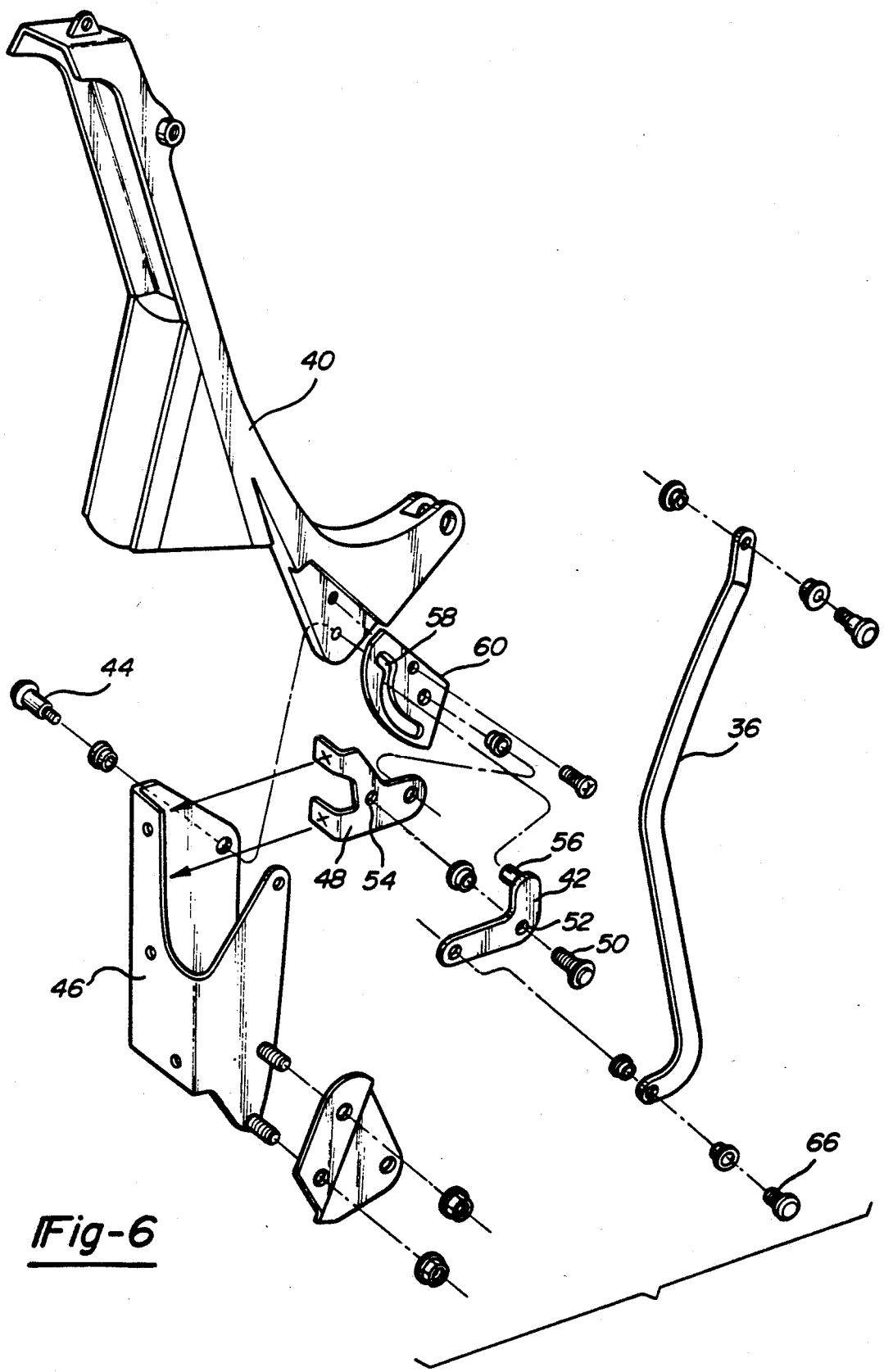
FIG. 6 is an exploded perspective view of a second embodiment of the present invention illustrating alternative means for longitudinally displacing the balance link as the convertible top is raised and lowered.

A second embodiment of the present invention is depicted in FIGS. 6-10 with FIG. 6 providing a detailed view of displacing means for longitudinally displacing a balance link 36. As with the first embodiment, FIG. 6 shows a portion of one side of the convertible top linkage assembly 38 having a pillar link 40, a balance link 36 and an idler link 42. As further shown in FIG. 6, the pillar link 40 is pivotally coupled by a pin 44 to a bracket 46 that fixedly attaches to a vehicle. The pillar link 40 is also coupled to one end of the idler link 42, and the opposite end of the idler link 42 is coupled to the balance link 36. Unlike the first embodiment, however, the idler link 42 in the second embodiment is L-shaped and is pivotally coupled to a structural member 48 that is fixedly attached to the bracket 46. As shown in FIG. 6, the idler link 42 is coupled to this structural member 48 by a pin 50 that passes through a bore 52 in the elbow of the L-shaped idler link 42 and engages with a bore 54 in the structural member 48. As further shown in FIG. 6, the idler link 42 is coupled to the balance link 36 by a pin 56 that extends from the upwardly extending portion of the idler link 42. This pin 56 engages with a curved slot 58 in a plate 60 that is fixedly attached to the pillar link 40. Accordingly, as the pillar link 40 is rotated, the plate 60 is correspondingly rotated which forces the pin 56 on the idler link 42 to be displaced by its camming engagement with the slot 58. As a result, the idler link 42 is pivoted about its coupling pin 50 which displaces the opposite end of the idler link 42 and forces the balance link 36 to longitudinally displace.

Figure 7:
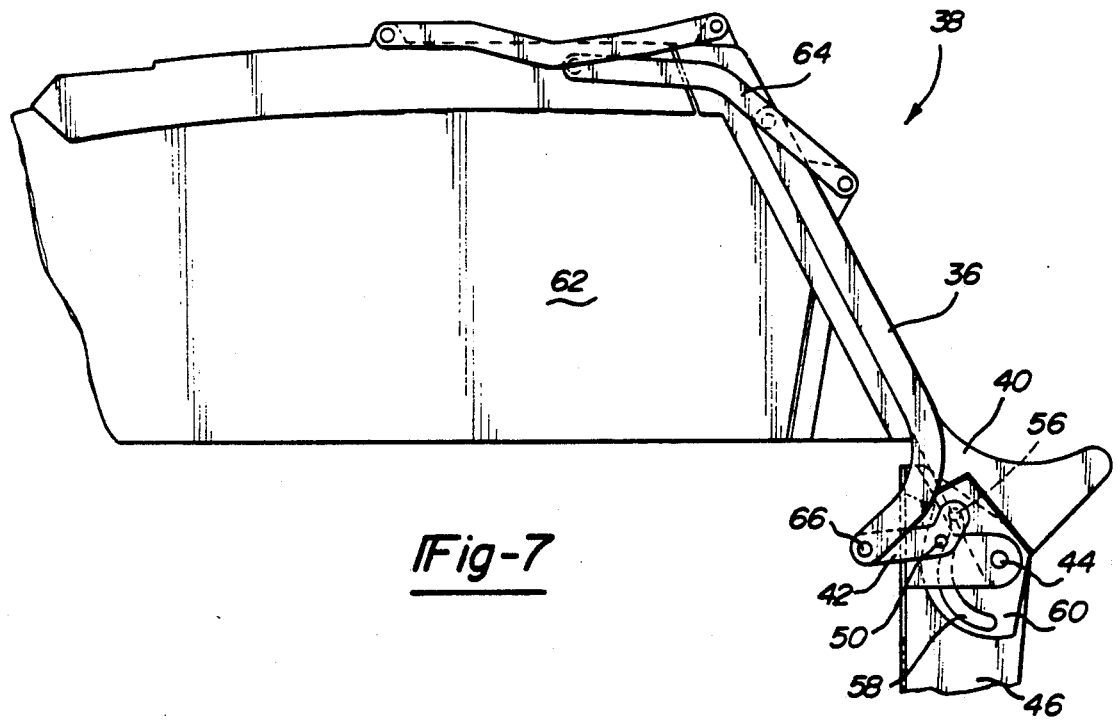
FIG. 7 is a schematic representation of the second embodiment of the present invention showing one side of the linkage assembly with the convertible top in a fully raised operative closed position.
Figure 8:
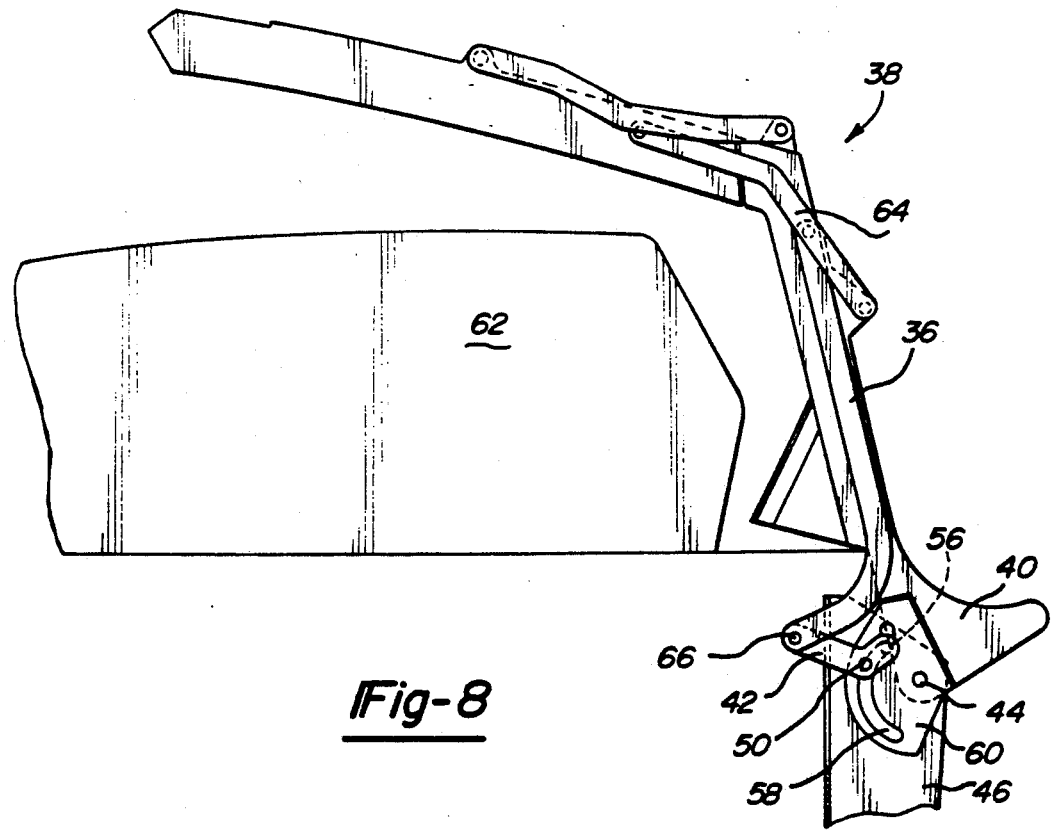
FIG. 8 is a schematic representation of the second embodiment showing one side of the linkage assembly with the convertible top slightly retracted from its raised operative position showing that there is clearance between the convertible top and the vehicle side window while the convertible top remains in a fully erect, non-collapsed position in accordance with the principles of the present invention.
Figure 9:
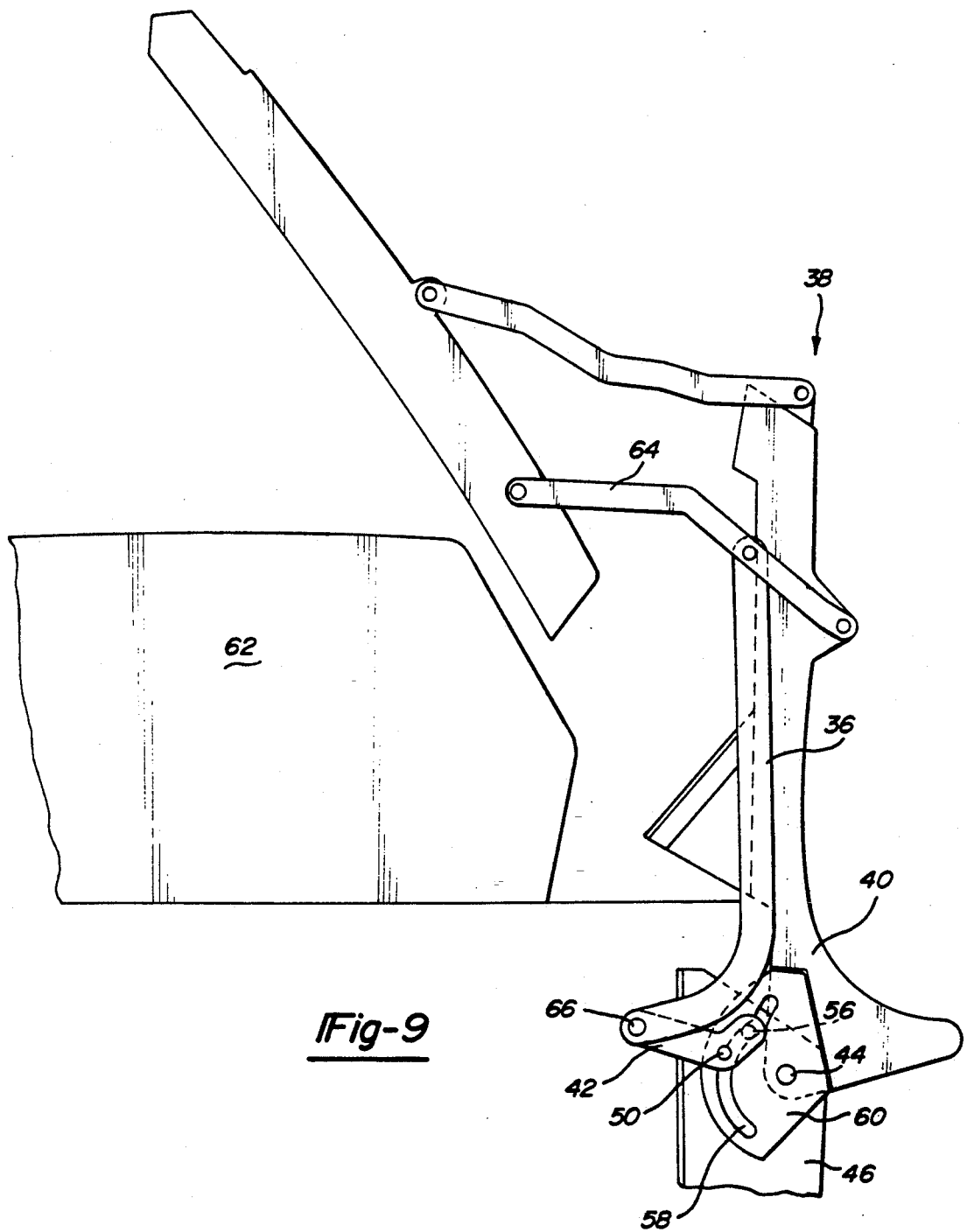
FIG. 9 is a schematic representation of the second embodiment of the present invention showing one side of the linkage assembly with the convertible top articulating into a collapsed position as the convertible top is lowered toward an on-board storage compartment.
Figure 10:
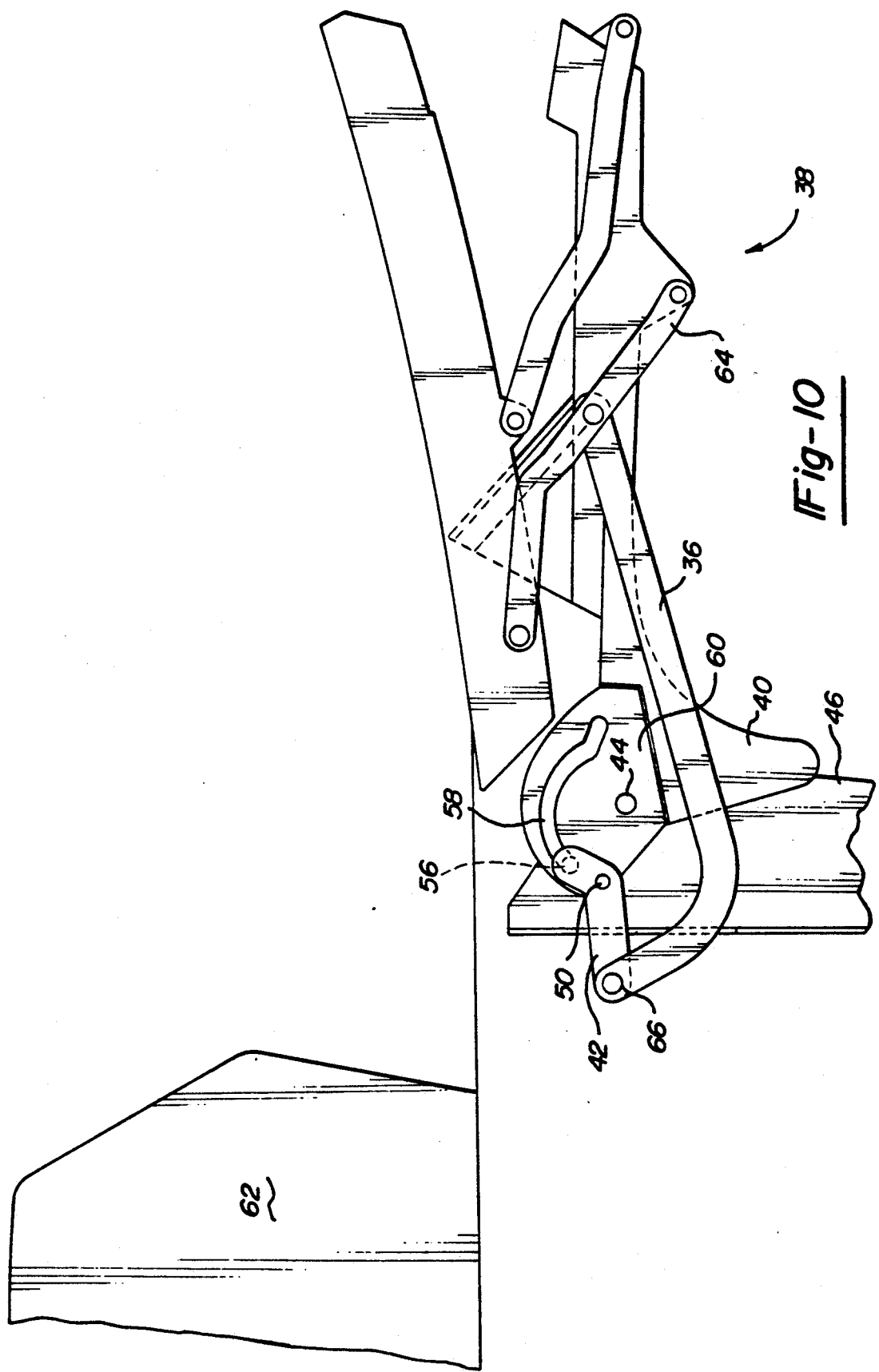
FIG. 10 is a schematic representation of the second embodiment of the present invention showing one side of the linkage assembly with the convertible top in a fully lowered, collapsed position within the on-board storage compartment.

FIGS. 7-10 schematically illustrate the balance link's longitudinal displacement, and its affect on the articulation of the linkage assembly 38 as the convertible top is raised and lowered. FIGS. 7-10 show one side of the linkage assembly 38 with the convertible top in positions that correspond to FIGS. 2-5 respectively. FIG. 7 shows the linkage assembly 38 in a raised operative position; FIG. 8 shows the linkage assembly 38 slightly retracted in a fully erect, uncollapsed state; FIG. 9 shows the linkage assembly 38 articulating as the convertible top is lowered; and FIG. 10 shows the linkage assembly 38 in a fully collapsed, lowered position.

The second embodiment, like the first embodiment, rotates with the linkage assembly geometry generally in a locked configuration as the convertible top is retracted from its raised operative position to the position shown in FIG. 8—where there is clearance between the convertible top and the vehicle side window 62. Note that as the convertible top is initially retracted, the pin 56 depending from the idler link 42 moves freely through a generally linear portion of the slot 58. As a result, the opposite end of the idler link 42 that is pivotally coupled to the balance link 36 merely floats with the movement of the balance link 36. Consequently, no loads are transmitted through the idler link 42 or the balance link 36. However, as the convertible top continues to retract from the position shown in FIG. 8, the pin 56 depending from the idler link 42 engages a curved portion of the slot 58 which has a camming affect on the pin 56. As shown in FIG. 9, this camming effect forces the idler link 42 to pivot about its coupling pin 50 which causes the opposite end of the idler link 42 to be displaced. This displacement of the idler link 42 longitudinally displaces the balance link 36, thereby actuating the control link 64 which causes the linkage assembly 38 to collapse.

As shown in FIG. 10, when the convertible top reaches its fully collapsed lowered position, the pin 66 coupling the balance link 36 to the idler link 42 has returned to the same position as its initial position shown in FIG. 7. Thus, the change in the balance link's effective length during raising and lowering does not affect the effective length of the balance link 36 when the convertible top is in a fully raised or lowered position. Like the first embodiment, the effective length of the balance link 36 only changes when the balance link 36 is longitudinally displaced to modify the articulation of the convertible top as it is cycled between its lowered position and its raised position.

Figure 11:
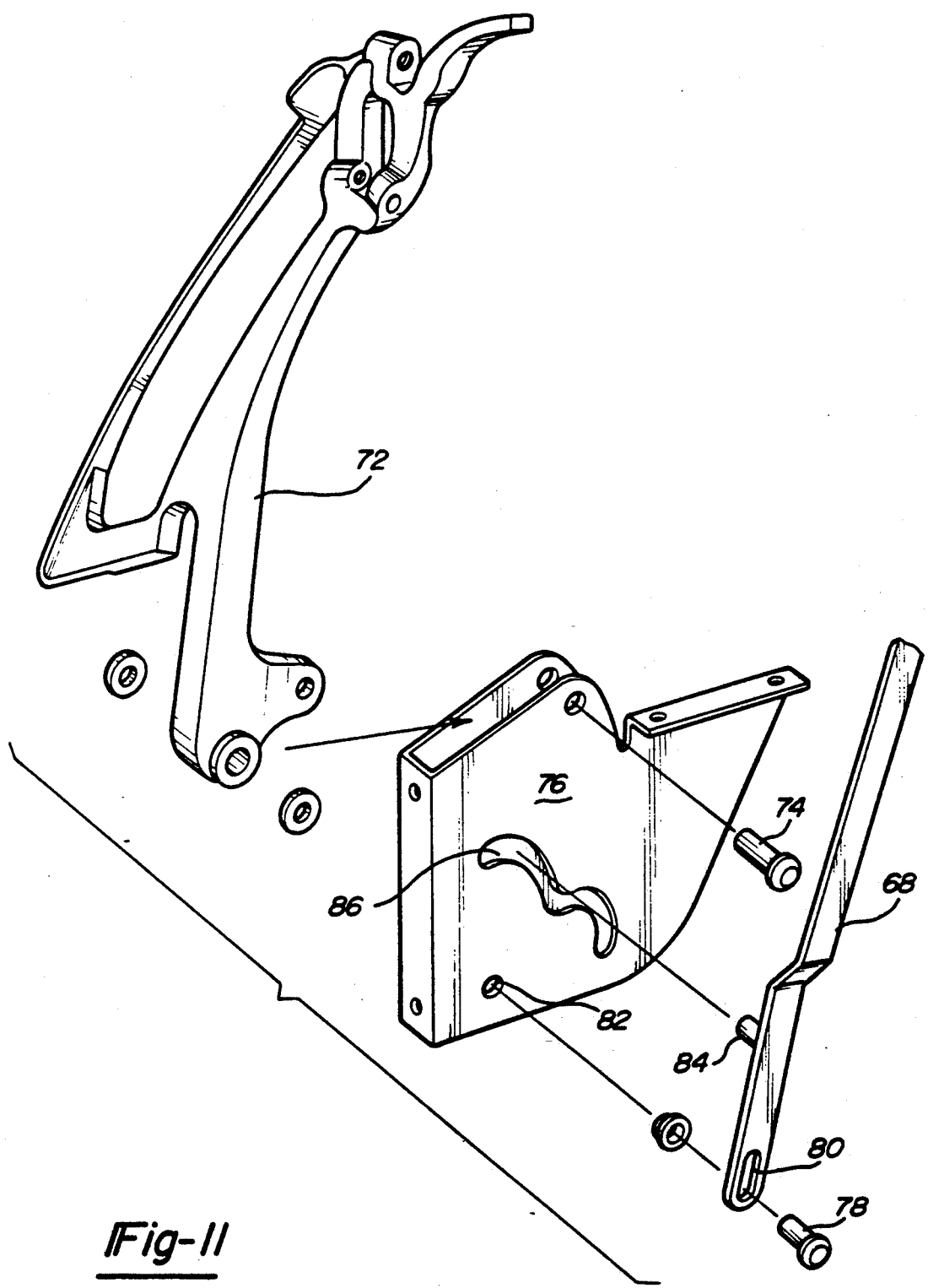
FIG. 11 is an exploded perspective view of a third embodiment of the present invention showing further alternative means for longitudinally displacing the balance link as the convertible top is raised and lowered.

A third embodiment of the present invention is depicted in FIGS. 11-15. FIG. 11 is a detailed view of displacing means for longitudinally displacing the balance link 68 as the convertible top is raised and lowered. FIG. 11 shows a portion of one side of the linkage assembly 70 having a pillar link 72 and a balance link 68. FIG. 11 also shows that the pillar link 72 is pivotally coupled by a pin 74 to a bracket 76 that fixedly attaches to a vehicle. The balance link 68 is also pivotally coupled to this bracket 76 by a pin 78 that passes through an elongated slot 80 in the lower end of the balance link 68 and engages with a bore 82 in the bracket 76. This balance link 68 also has a pin 84 that depends from an intermediate portion of the balance link 68 and engages with a curved slot 86 in the bracket 76.

Figure 12:
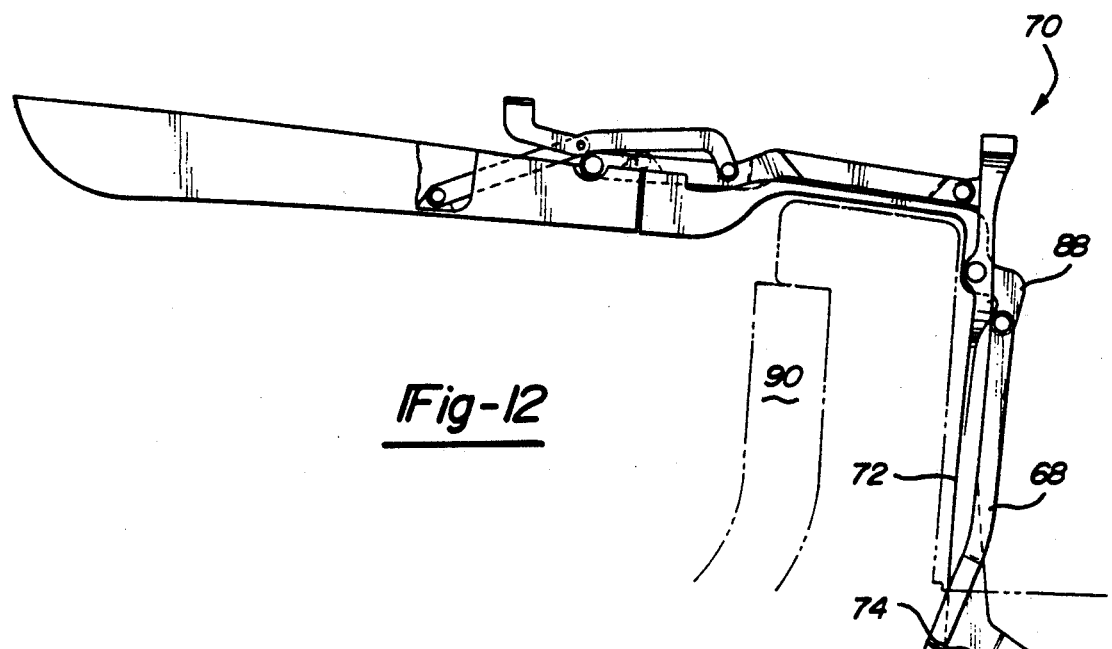
FIG. 12 is a schematic representation of the third embodiment of the present invention showing one side of the linkage assembly adequately clearing a roll bar with the convertible top in a raised operative position.
Figure 13:
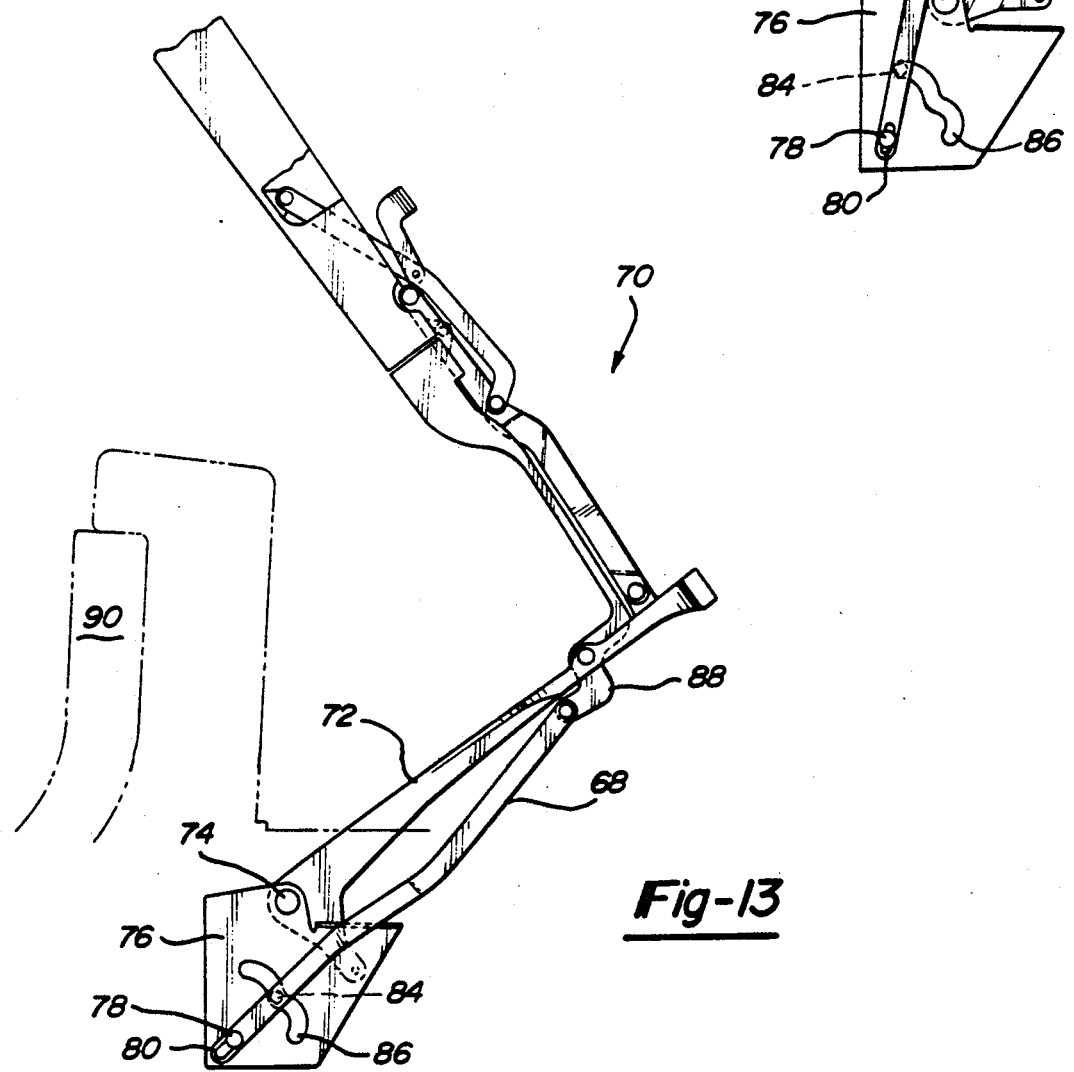
FIG. 13 is a schematic representation of the third embodiment showing one side of the linkage assembly with the convertible top slightly retracted from its raised operative position showing that there is clearance between the convertible top and the vehicle roll bar while the convertible top remains in a fully erect non-collapsed position in accordance with the principles of the present invention.
Figure 14:
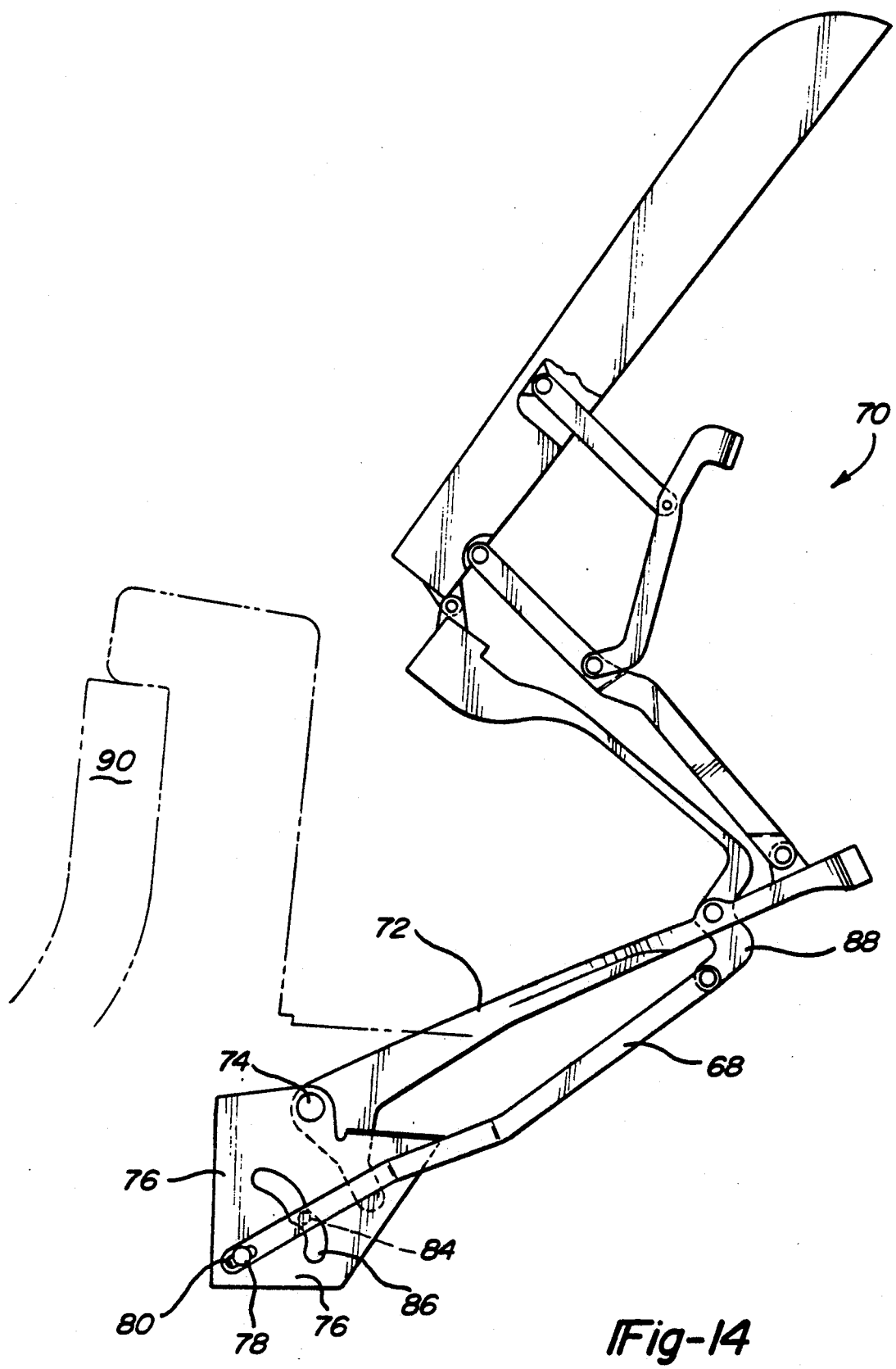
FIG. 14 is a schematic representation of the third embodiment of the present invention showing one side of the linkage assembly with the convertible top articulating into a collapsed position in close proximity with the roll bar as the convertible top is lowered toward an on-board storage compartment.

FIGS. 12-15 are schematic representations of one side of the linkage assembly 70 as the convertible top is cycled from a raised operative position, shown in FIG. 12, to a collapsed lowered position shown in FIG. 15. The positions of the convertible top in FIGS. 12-15 correspond respectively to the positions of the convertible top in FIGS. 2-5 in the first embodiment and FIGS. 7-10 in the second embodiment. As with the first two embodiments, when the convertible top is retracted from its raised operative position in FIG. 12 to the position shown in FIG. 13, the balance link 68 is permitted to float and is not loaded. However, as the convertible top is retracted from the position shown in FIG. 13 toward its lowered position shown in FIG. 15, the pin 84 depending from the balance link 68 is cammed by the curved wall of the slot 86. As a result, the balance link 68 is longitudinally displaced causing the balance link 68 to be loaded and the control link 88 to be actuated.

Note that the longitudinal displacement of the balance link 68 for this third embodiment directly corresponds to the shape of the camming slot 86. Obviously, this slot 86 can be tailored to longitudinally displace the balance link 68 as desired, thereby controlling actuation of the control link 88 to modify the articulation of the convertible top. For this particular embodiment, the articulation of the convertible top as it is raised and lowered has been modified to travel in a predetermined path such that the convertible top most efficiently clears a roll bar 90 in addition to the usual vehicle side windows (not shown). The roll bar is positioned over the rear of the passenger compartment and extends vertically from a portion of the vehicle that is directly adjacent to the forward edge of the onboard storage compartment. Thus, to clear the roll bar the convertible top initially raises in substantially a purely vertical manner from its onboard storage compartment until it achieves clearance over the roll bar. Once clearance is achieved, the convertible top is articulated to extend forward over the passenger compartment to its raised operative position as shown in FIG. 12. One of ordinary skill in the art would certainly recognize the advantages of controlling the articulation of a convertible top in this fashion as it is raised and lowered.

While it will be apparent that the three embodiments of the invention disclosed are well calculated to provide the advantages above stated, it will be appreciated that the invention is susceptible to modification, variation and change without departing from the proper scope or fair meaning of the subjoined claims.

What is claimed is:

1. A vehicle convertible top for covering the interior of a vehicle when in a raised operative position, having an improved means for controlling the articulation of said convertible top mechanism as it is raised and lowered, said improvement comprising:

(a) a linkage assembly coupled to said vehicle that provides a frame for said convertible top when in a raised operative position, and collapses into a lowered position for storage;

(b) means for allowing said linkage assembly to be retracted from said raised operative position, while in a generally uncollapsed state, to a position where there is clearance between the vehicle and the convertible top; and (c) means for collapsing said linkage assembly as said convertible top is lowered from said position where there is clearance between the vehicle and the convertible top.

2. The invention of claim 1 wherein said linkage assembly has a pair of balance links, a pair of pillar links and a pair of idler links.

3. The invention of claim 2 wherein said idler links are coupled to said balance links and said pillar links such that as the convertible top is retracted from its raised operative position to said position where there is clearance between the vehicle and the convertible top, said pillar links and said balance links rotate generally about a single axis.

4. The invention of claim 2 wherein said idler links are coupled to said balance links and said pillar links such that as the convertible top is retracted from its raised operative position to said position where there is clearance between the vehicle and the convertible top, the linkage assembly geometry remains in a locked configuration.

5. The invention of claim 1 wherein a spring is utilized to aid said retraction of the linkage assembly from said raised operative position while in a generally uncollapsed state, and is further utilized to prevent the linkage assembly from slamming into a windshield assembly as the convertible top is moved from said position where there is clearance to said raised operative position.

6. The invention of claim 1 wherein said means for allowing said linkage assembly to be retracted from said raised operative position, while in a generally uncollapsed state, is a balance link coupled to an idler link, said idler link having a pin depending therefrom that engages with a slot defined by structure that is fixed with respect to a pillar link, thereby allowing said balance link and said pillar link to rotate generally about a single axis as the convertible top is retracted from said raised operative position.

7. The invention of claim 1 wherein said clearance between the vehicle and the convertible top permits the convertible top to be freely collapsed without lowering side windows of said vehicle.

8. The invention of claim 1 wherein said means for collapsing said linkage assembly as said convertible top is lowered from said position where there is clearance between the vehicle and the convertible top, is a balance link that is longitudinally displaced as said convertible top is raised and lowered.

9. The invention of claim 8 wherein said balance link is forced to longitudinally displace by an idler link coupled to a pillar link.

10. The invention of claim 8 wherein said balance link is forced to longitudinally displace by a pin depending from the balance link that engages with a slot defined by structure that is stationary with respect to the said vehicle.

11. A vehicle convertible top for covering the interior of a vehicle when in a raised operative position, having an improved means for controlling the articulation of said convertible top as it is raised and lowered, said improvement comprising:

(a) a linkage assembly coupled to said vehicle that provides a frame for said convertible top when in a raised operative position, and collapses into a lowered position for storage;

(b) means for articulating said linkage assembly from a collapsed storage position to an uncollapsed state as said convertible top is raised to a position where there is clearance between said convertible top and said vehicle; and (c) means for allowing said uncollapsed linkage assembly to be moved from said position where there is clearance between the vehicle and the convertible top, to said raised operative position.

12. The invention of claim 11 wherein said linkage assembly has a pair of balance links, a pair of pillar links and a pair of idler links.

13. The invention of claim 12 wherein said idler links are coupled to said balance links and said pillar links such that as the convertible top is moved from said position where there is clearance between the vehicle and the convertible top to said raised operative position, said pillar links and said balance links rotate generally about a single axis.

14. The invention of claim 12 wherein said idler links are coupled to said balance links and said pillar links such that as the convertible top is moved from said position where there is clearance between the vehicle and the convertible top to said raised operative position, the linkage assembly geometry remains in a locked configuration.

15. The invention of claim 11 wherein said means for allowing said uncollapsed linkage assembly to be moved from said position where there is clearance between the vehicle and the convertible top, is a balance link coupled to an idler link, said idler link having a pin depending therefrom that engages with a slot defined by structure that is fixed with respect to a pillar link, thereby allowing said balance link and said pillar link to rotate generally about a single axis as the convertible top is moved to said raised operative position.

16. The invention of claim 11 wherein said means for allowing said uncollapsed linkage assembly to be moved from said position, where there is clearance between the vehicle and the convertible top, to said raised operative position, eliminates header slam.

17. The invention of claim 11 wherein said means for articulating said linkage assembly from a collapsed storage position to an uncollapsed state where there is clearance between the vehicle and the convertible top, is a balance link that is longitudinally displaced as said convertible top is raised and lowered.

18. The invention of claim 17 wherein said balance link is forced to be longitudinally displaced by an idler link coupled to a pillar link.

19. The invention of claim 17 wherein said balance link is forced to longitudinally displace by a pin depending from the balance link that engages with a slot defined by structure that is stationary with respect to said vehicle.

20. An improved vehicle convertible top linkage assembly coupled to a vehicle that retracts into a collapsed position and can be raised into an erect position over the interior of said vehicle, said improvement comprising:

(a) a pair of pillar links within said linkage assembly pivotally coupled to said vehicle;

(b) a pair of balance links for controlling the articulation of said linkage assembly as it is erected and collapsed;

(c) coupling means for pivotally coupling said balance links to said linkage assembly such that said balance links can be longitudinally displaced; and (d) displacing means for actuating the longitudinal displacement of said balance links.

21. The invention of claim 20 wherein said displacing means displaces said balance links in a predetermined relationship with pivotal movement of said pillar links.

22. The invention of claim 20 wherein said displacing means is designed to displace said balance links such that as said convertible top linkage assembly is erected and retracted, articulation of said convertible top linkage assembly can be controlled.

23. The invention of claim 20 wherein said displacing means for actuating the displacement of said balance links is a pin depending from each balance link that engages with a slot defined by structure that is stationary with respect to said vehicle.

24. The invention of claim 20 wherein said displacing means for actuating the displacement of said balance links is an idler link that couples to both the balance link and the pillar link.

25. The invention of claim 24 wherein said idler link is coupled to said pillar link by a pin depending from the idler link that engages with a slot defined by structure that is stationary relative to said pillar link, such that as said pillar link is rotated, said pin is cammed by the walls of the slot causing said idler link to displace said balance link.

26. The invention of claim 20 wherein said coupling means for pivotally coupling said balance link to said linkage assembly is a pin fixedly attached to a stationary portion of said vehicle that engages a slot within said balance link.

27. The invention of claim 20 wherein said control over the articulation of said linkage assembly allows the convertible top to be raised or lowered in a predetermined path such that as said convertible top is raised and lowered, it most efficiently clears obstructions such as roll bars, side windows, etc.

28. The invention of claim 20 wherein as said convertible top is moved between a slightly retracted position where there is clearance between the convertible top and the vehicle, and the raised operative position, the balance link is not loaded.

29. The invention of claim 20 wherein as said convertible top is moved between a slightly retracted position where there is clearance between the convertible top and the vehicle, and the raised operative position, the balance link is not actuated.

30. An improved vehicle convertible top linkage assembly that provides structural support for a pliable convertible top covering that covers the interior of a vehicle when in a raised operative position, said improvement comprising:

(a) a pair of pillar links pivotally coupled to said vehicle;

(b) a pair of balance links for controlling the articulation of said linkage assembly as it is collapsed when being lowered and as it is erected when being raised; and (c) a pair of idler links, coupled to said balance links and said pillar links, for controlling the path of movement of said convertible top linkage assembly.

31. The invention of claim 30 wherein said idler links are coupled to said balance links and said pillar links such that as the convertible top is moved from said position where there is clearance between the vehicle and the convertible top to said raised operative position, said pillar links and said balance links rotate generally about a single axis.

32. The invention of claim 30 wherein said idler links are coupled to said balance links and said pillar links such that as the convertible top is retracted from its raised operative position to said position where there is clearance between the vehicle and the convertible top, the linkage assembly geometry remains in a locked configuration.

33. The invention of claim 30 wherein said idler link is coupled to said pillar link by a pin depending from the idler link that engages with a slot defined by structure that is stationary relative to said pillar link, such that as said pillar link is rotated, said pin is cammed by the walls of the slot causing said idler link to displace said balance link.

34. The invention of claim 30 wherein said balance link is coupled to said idler link with a pin such that said balance link is able to pivot and be longitudinally displaced.

35. The invention of claim 30 wherein said balance link is forced to longitudinally displace by an idler link coupled to a pillar link.

36. The invention of claim 30 wherein as said convertible top is moved between a slightly retracted position where there is clearance between the convertible top and the vehicle, and the raised operative position, the balance link is not loaded.

37. The invention of claim 30 wherein as said convertible top is moved between a slightly retracted position where there is clearance between the convertible top and the vehicle, and the raised operative position, the control link is not actuated.

38. The invention of claim 30 wherein said balance links are displaced in a predetermined relationship with pivotal movement of said pillar links.

39. An improved vehicle convertible top linkage assembly that provides structural support for a pliable convertible top covering that covers the interior of a vehicle when in a raised operative position, said improvement comprising:

(a) a pair of pillar links pivotally coupled to said vehicle;

(b) a pair of balance links capable of pivotal and longitudinal displacement for actuating the articulation of said linkage assembly into a collapsed position as it is lowered and into a non-collapsed, erect position as it is raised; and (c) displacing means for longitudinally displacing said balance links in a predetermined relationship with the pivotal displacement of said pillar links.

40. The invention of claim 39 wherein said displacing means is designed to displace said balance links such that as said convertible top linkage assembly is erected and retracted, articulation of said convertible top linkage assembly can be controlled.

41. The invention of claim 39 wherein said displacing means for actuating the displacement of said balance links is a pin depending from each balance link that engages with a slot defined by structure that is stationary with respect to said vehicle.

42. The invention of claim 39 wherein said displacement of said balance links actuates control links.

43. The invention of claim 39 wherein said displacement of the balance links for actuating the articulation of said linkage assembly can be controlled so that the convertible top can be raised or lowered in a predetermined path such that as said convertible top is raised and lowered, it most efficiently clears obstructions such as roll bars, side windows, etc.

44. The invention of claim 39 wherein said balance link is coupled to said linkage assembly by a pin that passes through a slot within said balance link and engages with a bore in a stationary portion of said vehicle.

45. An improved method for moving a vehicle convertible top that utilizes a linkage assembly with an elongated balance link therein from its fully raised operative position, where it covers the interior of the vehicle, into a fully retracted position and for moving said vehicle convertible top from said retracted position to said operative position, said improvement comprising the steps of:
(a) raising said convertible top a limited distance from its fully retracted position;
(b) thereafter causing longitudinal displacement of a balance link along a longitudinal axis of said balance link, thereby effecting the path of movement of the articulation of said convertible top as it is further raised to its fully erect state; and
(c) thereafter moving said convertible top to its fully raised operative position.

46. The method of claim 45 wherein the step of causing longitudinal displacement of a balance link involves an idler link displacing said balance link in a predetermined relationship with respect to pivotal motion of a pillar link.

47. The method of claim 45 wherein the step of causing longitudinal displacement involves a pin depending from said balance link and engaging with a stationary slot, thereby displacing said balance link longitudinally as the convertible top is raised and lowered.

48. The method of claim 45 wherein the step of raising said convertible top such that said convertible top is in a fully erect, uncollapsed state further comprises achieving said erect, uncollapsed state at a position slightly above said vehicle, thereby providing clearance between said fully erect convertible top and said vehicle.

49. The method of claim 45 wherein the step of placing said convertible top in an operative position involves moving the fully erect, uncollapsed convertible top from a position where there is clearance between the convertible top and the vehicle, to a position where said convertible top can be latched to said vehicle.

50. The method of claim 45 wherein the step of placing said convertible top in said operative position is accomplished by rotating said convertible top about a single axis in a fully erect, uncollapsed state.

51. The method of claim 45 wherein the step of retaining said convertible top in said operative position involves latching said convertible top to said vehicle with conventional J hooks.

52. The method of claim 45 wherein said steps, when preformed in reverse, describe the method for lowering said convertible top.

53. A vehicle convertible top for covering the interior of a vehicle when in a raised operative position, having an improved means for controlling the articulation of said convertible top as it is raised and lowered, said improvement comprising:

(a) a linkage assembly coupled to said vehicle that provides a frame for said convertible top when in a raised operative position, and collapses into a lowered position for storage;
(b) means for articulating said linkage assembly from a collapsed storage position to an uncollapsed state as said convertible top is raised to a position where there is clearance between said convertible top and said vehicle, said means utilizing a link that is longitudinally displaced by a follower depending from the link that engages with a camming surface defined by structure that is stationary with respect to said vehicle; and
(c) means for allowing said uncollapsed linkage assembly to be moved from said position where there is clearance between the vehicle and the convertible top, to said raised operative position.

54. An improved vehicle convertible top linkage assembly that provides structural support for a pliable convertible top covering that covers the interior of a vehicle when in a raised operative position, said improvement comprising:
(a) a pair of pillar links pivotally coupled to said vehicle;
(b) a pair of balance links capable of pivotal and longitudinal displacement for actuating the articulation of said linkage assembly into a collapsed position as it is lowered and into a non-collapsed, erect position as it is raised; and
(c) displacing means for longitudinally displacing said balance links in a predetermined relationship with the pivotal displacement of said pillar links, said displacing means having a follower depending from each balance link and engaging with a camming surface defined by structure that is stationary with respect to said vehicle.

55. An improved method for lowering a vehicle convertible top having a linkage assembly with a plurality of links from its fully raised operative position, where it covers the interior of the vehicle, into a fully retracted position and for raising said vehicle convertible top from said retracted position to said operative position, said improvement comprising the steps of:
(a) raising said convertible top a limited distance from its fully retracted position, said raising of said convertible top causing a follower member depending from one of said plurality of links to engage a camming surface that is stationary with respect to said vehicle, thereby displacing said link longitudinally;
(b) said longitudinal displacement of the balance link effecting an articulating movement of said convertible top as it is further raised to its fully erect state; and
(c) thereafter moving said convertible top to its fully raised operative position.

56. The invention of claim 1 wherein said linkage assembly includes a balance link, said balance link having a slot defined therein for interacting with said linkage assembly.

57. The invention of claim 11 wherein said linkage assembly includes a balance link, said balance link having a slot defined therein for interacting with said linkage assembly.

58. The invention of claim 20 wherein each of said balance links has a slot defined therein for interacting with said linkage assembly.

59. The invention of claim 39 wherein each of said balance links has a slot defined therein for interacting with said linkage assembly.

* * * * *

UNITED STATES PATENT AND TRADEMARK OFFICE
CERTIFICATE OF CORRECTION

PATENT NO. : 5,161,852

DATED : November 10, 1992

INVENTOR(S) : Michael P. Alexander et al

It is certified that error appears in the above-identified patent and that said Letters Patent is hereby corrected as shown below:

Column 7, line 60, after "to" insert -- be --.

Column 7, line 60, "displace" should be -- displaced --.

Column 7, line 63, after "to" insert -- be --.

Column 7, line 63, "displace" should be -- displaced --.

Column 8, line 60, after "to" insert -- be --.

Column 8, line 60, "displace" should be -- displaced --.

Column 10, line 29, after "to" insert -- be --.

Column 10, line 29, "displace" should be -- displaced --.

Column 11, line 62, "perform" should be -- performed --.

Signed and Sealed this

Twenty-sixth Day of October, 1993

Attest:

BRUCE LEHMAN

*Attesting Officer*     *Commissioner of Patents and Trademarks*